United States Patent [19]
Webb et al.

[11] Patent Number: 4,989,096
[45] Date of Patent: Jan. 29, 1991

[54] PRODUCING HALF-TONE IMAGES OF HIGHER RESOLUTION THROUGH INTERPOLATION OF ORIGINAL DATA

[75] Inventors: Graham Webb; Richard A. Kirk, both of Hertfordshire

[73] Assignee: Crosfield Electronics Limited, London, England

[21] Appl. No.: 352,521

[22] Filed: May 16, 1989

[30] Foreign Application Priority Data

May 16, 1988 [GB] United Kingdom ............... 8811568

[51] Int. Cl.⁵ .................... H04N 1/23; H04N 1/40
[52] U.S. Cl. .................................. 358/298; 358/456
[58] Field of Search ............. 358/298, 442, 443, 447, 358/448, 456, 445, 457, 460, 455

[56] References Cited

U.S. PATENT DOCUMENTS

| | | | |
|---|---|---|---|
| 4,068,266 | 1/1978 | Liao | 358/442 |
| 4,258,393 | 3/1981 | Ejiri et al. | 358/457 |
| 4,280,144 | 7/1981 | Bacon | 358/455 |
| 4,356,555 | 10/1982 | Ejiri et al. | 358/447 |
| 4,644,409 | 2/1987 | Fuchs | 358/443 |
| 4,686,579 | 8/1987 | Sakamoto | 358/457 |
| 4,736,254 | 4/1988 | Kotera | 358/457 |
| 4,821,109 | 4/1989 | Roe | 358/456 |
| 4,841,375 | 6/1989 | Nakajima | 358/442 |

FOREIGN PATENT DOCUMENTS 0047145 3/1982 European Pat. Off.
0070677 1/1983 European Pat. Off.

Primary Examiner—Bruce A. Reynolds
Assistant Examiner—Scott A. Rogers
Attorney, Agent, or Firm—Sughrue, Mion, Zinn, Macpeak & Seas

[57] ABSTRACT

A method and apparatus for generating a half-tone version of an image represented by a first set of digital data defining the colour content of abutting pixels of the image at a first resolution. The apparatus comprises a radiation beam generator (8); a record medium support (11), wherein the radiation beam and the support are relatively moveable such that the radiation beam scans a record medium (10) mounted on the support in a series of abutting scan lines; a radiation beam modulator (7) for modulating the radiation beam in response to a control signal (CS); and a control signal generator (5) for generating the control signal. The radiation beam is modulated selectively to expose a record medium on the support (11) at a second, finer resolution, the control signal generator (5) being adapted to interpolate the second set of digital data from the first set of digital data and to generate the control signal by comparing the second set of digital data with half-tone information.

10 Claims, 3 Drawing Sheets

Fig. 2.

| 96 | 89 | 78 | 63 | 45 | 55 | 72 | 85 | 94 | 99 |
|----|----|----|----|----|----|----|----|----|----|
| 88 | 77 | 62 | 44 | 28 | 46 | 56 | 73 | 86 | 95 |
| 76 | 61 | 43 | 27 | 15 | 29 | 47 | 57 | 74 | 87 |
| 60 | 42 | 26 | 14 | 6  | 16 | 30 | 48 | 58 | 75 |
| 41 | 25 | 13 | 5  | 1  | 7  | 17 | 31 | 49 | 59 |
| 40 | 24 | 12 | 4  | 0  | 2  | 8  | 18 | 32 | 50 |
| 67 | 39 | 23 | 11 | 3  | 9  | 19 | 33 | 51 | 68 |
| 81 | 66 | 38 | 22 | 10 | 20 | 34 | 52 | 69 | 82 |
| 91 | 80 | 65 | 37 | 21 | 35 | 53 | 70 | 83 | 92 |
| 97 | 90 | 79 | 64 | 36 | 54 | 71 | 84 | 93 | 98 |

PRODUCING HALF-TONE IMAGES OF HIGHER RESOLUTION THROUGH INTERPOLATION OF ORIGINAL DATA

FIELD OF THE INVENTION

The invention relates to methods and apparatus for generating a half-tone version of an image.

DESCRIPTION OF THE PRIOR ART

To an approximation most halftone output scanners may be considered to be producing a bilevel image: that is one that is either black or white with no intermediate shades of grey. The exposure is often done by exposing the film in elemental areas or textels. Consider the hard dot output case where the exposure can have only two binary states—0 (light) or 1 (dark). The image to be outputted is digitised in elemental areas or pixels. It is usual practice for the textel size to be considerably smaller than the pixel size or the repeat in the dot pattern. For example images digitised at a resolution of 12 pixels/mm are commonly output with a halftone screen pitch of 6 dots/mm and a resolution of 72 textels/mm. In this example the textel frequency is six times the pixel frequency.

In a conventional hard dot output scanner the halftones may be generated as follows. The pixel data is replicated to achieve the textel resolution. The replicated pixel data is then added to a regular screen function—if the sum is greater than a threshold then the corresponding textel value is set to 1 (dark), otherwise it is set to 0 (light). The textel data is then used to expose the film.

Replicating the pixel data to get to textel resolution has some disadvantages. Where the pixel values are varying considerably from one to the next then the resulting dot shapes may have sharp corners and edges. These are often hard to print and can lead to differences between the proofing process performance and the printing process it is supposed to simulate. This can also give aliasing problems when the original data has had its sharpness digitally enhanced too much.

A possible solution described in our co-pending European patent application No. EP-A-0247830 involves scanning the original image in a series of overlapped scan lines. In this way, the number of input pixels is increased, typically doubled which will automatically lead to an increase in spatial resolution. However, one problem with this process is that there is a significant increase in scanning time required.

SUMMARY OF THE INVENTION

In accordance with one aspect of the present invention, a method of generating a half-tone version of an image represented by a first set of digital data defining the colour content of abutting pixels of the image at a first resolution in which a record medium is selectively exposed in response to a control signal representing image pixels at a second, finer resolution, the control signal being generated by comparing the second set of digital data with half-tone information is characterized by at least partly interpolating the second set of data from the first set of data.

In accordance with a second aspect of the present invention, apparatus for generating a half-tone version of an image represented by a first set of digital data defining the colour content of abutting pixels of the image at a first resolution comprises recording means; a record medium support, wherein the recording means and the support are relatively moveable such that an image can be recorded on a record medium mounted on the support in a series of abutting scan lines; and a control signal generator for generating a control signal representing image pixels at a second, finer resolution, which is fed to the recording means such that a record medium on the support is selectively exposed at the second, finer resolution, the control signal generator being adapted to generate the control signal by comparing the second set of digital data with half-tone information, characterized in that the control signal generator at least partly interpolates the second set of digital data from the first set of digital data.

We have devised a new process and apparatus in which processes such as feature enhancement or tone smoothing can be performed within the half-tone dot generator rather than upstream of the dot generator as has previously been the case. This allows the apparent sharpness of the half-tone output to be matched to the continuous tone original image.

It will be appreciated, that this invention makes use of the fact that in conventional half-tone reproduction processes, each half-tone dot is defined at a second, textel resolution much higher than the original first, pixel resolution.

The method and apparatus can be used to apply a variety of functions, for example an unsharp masking algorithm, or a function to improve the reproduction accuracy of an output scanner.

In some cases, to simplify the calculations, the second set of digital data is obtained from the first set by interpolating a third (or intermediate) set of digital data defining image pixels at a third resolution finer than the first resolution but no finer than the second resolution, and thereafter replicating the third set of image data to obtain the second set.

The method by which pixels are generated at the third resolution is determined empirically and may comprise solely interpolation or a combination of interpolation and replication techniques.

The record medium may be exposed in any conventional manner for example using an ink jet or radiation beam.

The invention is applicable to the modulation of a single radiation beam but may also be used where the radiation beam comprises a plurality of subsidiary beams each of which is modulated by the same control signal in a single pass across the record medium. In addition to this, however, each subsidiary radiation beam may be individually further modulated, if desired, to achieve additional accuracy as described, for example, in EP-A-0151353.

BRIEF DESCRIPTION OF THE DRAWINGS

An example of a method and apparatus in accordance with the present invention will now be described with reference to the accompanying drawings, in which:

FIG. 2 illustrates the half-tone dot information corresponding to a single dot cell; and, FIG. 3 illustrates schematically the arrangement of original image pixels at a first resolution and subsequently generated third resolution pixels.

DETAILED DESCRIPTION OF AN EMBODIMENT

Figure 1:
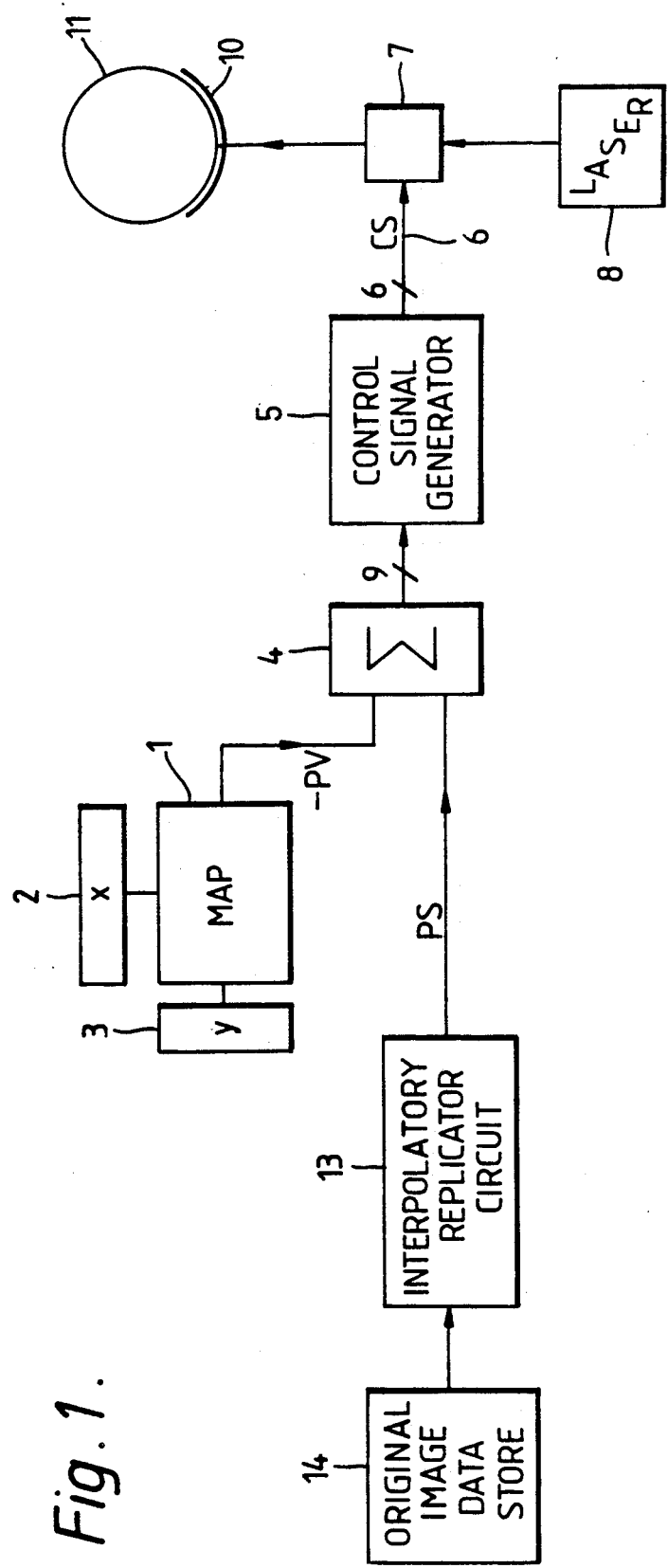
FIG. 1 is a block diagram of the apparatus.

The apparatus shown in FIG. 1 comprises a half-tone dot generator including a store 1 defining half-tone dot information. A simple example of the half-tone dot information where the dot lattice axes are aligned with the scan direction is shown in FIG. 2. This map shows the 10×10 textel dot unit cell value ranging from 0 to 99 dot %. In a real device the unit cell is approximately 12 units square skewed at some angle to the scan direction, with values ranged to be in the same units as the source data. The map is addressed by X and Y address generators 2, 3 which track the position of the exposing laser beams, to be described below, on a record medium. The store 1 is connected to an adder circuit 4 such that the inverse of the addressed value from the store 1 ($-PV$) is applied to the adder 4. In addition, a picture signal (PS) is applied to the other input of the adder 4. The generation of this picture signal PS will be explained in more detail below. However, the picture signal defines colour density values for each pixel of a colour component corresponding to the separation being generated.

The output signal from the adder circuit 4 is fed to a control signal generator 5 which generates a control signal which is fed to a laser beam modulator 7 which controls the intensity of a laser beam from a laser 8, while the beam impinges on a record medium 10 mounted on a rotatable cylinder 11. Relative movement is caused, in a conventional manner, between the beam and the cylinder 11 such that the radiation beam scans along a series of abutting scan lines across the record medium 10.

Each control signal usually constitutes a binary value of one or zero such that if the control signal (CS) is binary zero then modulator 7 reduces the intensity of the outgoing laser beam whereas if the control signal CS has a value one then the full intensity beam will pass to the record medium 10. In a modification, the laser beam may have an intermediate value, particularly at the edge of a half-tone dot.

In a further modification, the laser beam may be split up into many beams e.g. six, each of which is modulated in the same manner as a single beam.

The position of each beam on the record medium 10 is continuously monitored in a conventional manner and the location of impingement of each beam is represented by respective X and Y values which are used to address the map 1.

Figure 3:
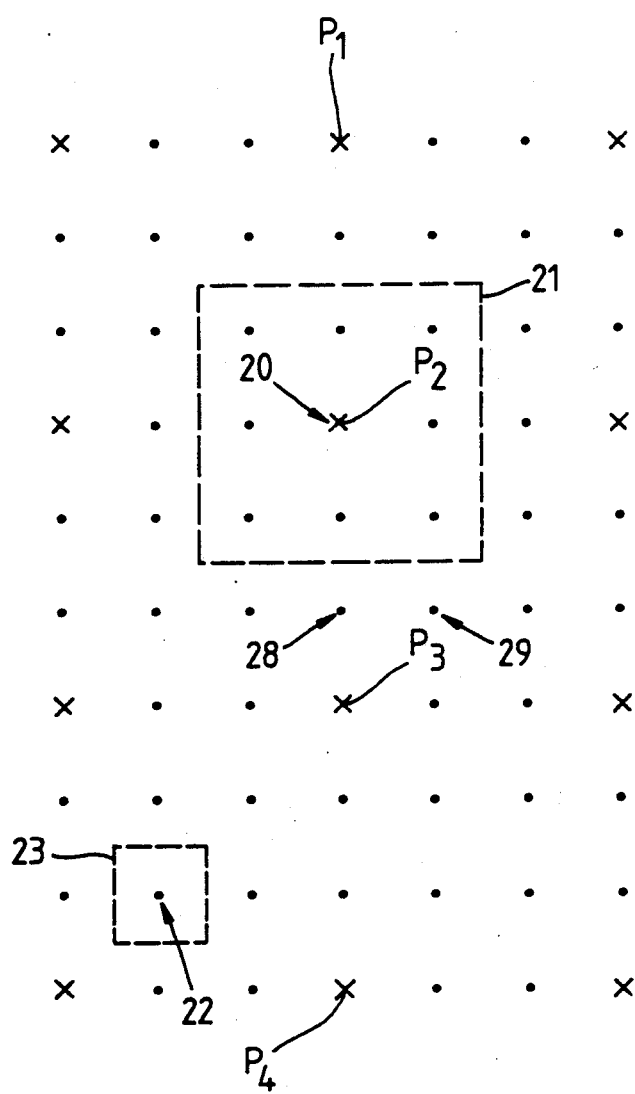

The apparatus is used to generate a half-tone reproduction of an original image which will have been generated in a conventional manner so as to be represented by a series of digital data values corresponding to pixels of that original image at a first resolution. FIG. 3 illustrates a small portion of the original image in terms of pixel positions, the original pixels being labelled "X". These pixel values may be fed directly to an interpolator/replicator circuit 13 or may be stored in a data store 14 (as shown in FIG. 1).

Conventionally, the interpolator/replicator circuit 13 is omitted and the store 14 is addressed directly so as to pass each pixel value in turn to the adder circuit 4. Typically, the pixel values will represent colour density percentages for the colour component concerned although other representations of colour density could also be used. In any event, the same representation should be used to represent the original pixels and the data values in this store 1. In the present case, it will be assumed that each pixel may be represented by a value ranging between zero and one hundred. In other words a percentage value.

In a simple example the store 1 need only contain the 100 values of a 10×10 unit cell. More commonly the screen is at some angle to the scan direction so as to give a repeat in the scan direction after passing through several unit cells. Store 1 would then contain the new giant unit cell containing many dot unit cells. In some cases it is possible to reduce the amount of data in store where the data in one row or column is repeated in another.

For each element, store 1 is accessed to provide a digital value which is compared with the picture signal PS to determine whether the laser beam concerned should expose or not expose the corresponding part of the record medium depending on whether or not PS is greater than the digital value.

For example consider a region of flat tint of 25 dot % and store 1 contains the simple unit cell data of FIG. 2. In this case PS =25 throughout, so the film would be exposed for the diamond shaped region of FIG. 2 with values 0 –24, and unexposed otherwise. This is achieved simply in the adder 4 by comparing the picture signal with each elemental value and causing the beam to be exposed if the picture signal is greater than the elemental value. Conventionally the second (textel) resolution signal PS is taken to be equal to the nearest first resolution pixel value. In FIG. 3 where the original pixel values are represented with an "x", the signal PS would be equal to the pixel value 20 within the square 21 but discontinuous at the boundary. This discontinuity can lead to the anomalous high frequency effects previously described.

With an intermediate resolution interpolation, represented by "." in FIG. 3, the value 22 is only held to be constant over the smaller square 23, the effects of the discontinuity are reduced, and the half-tone image is improved.

It will be noted that the number of scanned pixel values remains the same and that there is no increase in the scanning time required over the conventional process.

Although the example has been described in which the third resolution is three times the first resolution in each direction, other multiples are possible up to the finest, second resolution.

Various methods may be used to generate the sub-pixel values within the interpolator/replicator circuit 13. In one method, a new sub-pixel, for example the sub-pixel 28 in FIG. 3 is generated from the 4 adjacent original pixel values $P_1$–$P_4$ using the one dimensional formula:

$$AP_1 + BP_2 + CP_3 + DP_4$$

where $A-D$ are weighting coefficients chosen so as to define a cubic interpolation algorithm and where $A+B+C+D=1$. The same algorithm is then used in the other dimension to generate sub-pixel 29. This type of interpolation can inherently cause an unsharp mask to be applied. Following this, the sub-pixels are replicated up to the second resolution.

If it is desired to smooth the image then a cubic spline interpolation could be used.

An alternative way of generating the sub-pixel values is to interpolate the second resolution pixels directly from the first (original) pixels. This usually causes the half-toned image to appear less sharp than the original.

Although the invention is primarily for use in generating a number of colour separations corresponding to a coloured image, it is also suitable for generating reproductions of monochrome images.

We claim:

1. A method of generating a half-tone version of an image represented by a first set of digital data defining the colour content of abutting pixels of said image at a first resolution in which a record medium is selectively exposed in response to a control signal representing image pixels at a second, finer resolution, the control signal being generated by comparing a second set of digital data with half-tone information wherein said second set of digital data is at least partly interpolated from the said first set of data.

2. A method according to claim 1, wherein said half-tone information defines an array of half-tone dot elements at said second resolution, each said element being associated with a respective threshold value, whereby each pixel at said second resolution is compared with said threshold values of a respective section of said half-tone dot elements chosen in accordance with the relative position of the exposing beam within a half-tone dot portion in order to generate said control signal.

3. A method according to claim 2, wherein each said half-tone dot section comprises a square array of dot elements at said second resolution.

4. A method of generating a half-tone version of an image represented by a first set of digital data defining the colour content of abutting pixels of said image at a first resolution in which a record medium is selectively exposed in response to a control signal representing image pixels at a second, finer resolution, the control signal being generated by comparing a second set of digital data with half-tone information wherein said second set of digital data is at least partly interpolated from the said first set of data, wherein said second set of digital data is obtained from said first set by interpolating a third set of digital data defining image pixels at a third resolution finer than the first resolution but no finer than the second resolution, and thereafter replicating said third set of image data to obtain said second set.

5. A method according to claim 1, wherein said interpolation is such as to enhance features in the reproduced image.

6. A method according to claim 5, wherein the interpolation is based on a cubic function.

7. A method of generating a half-tone version of an image represented by a first set of digital data defining the colour content of abutting pixels of said image at a first resolution in which a record medium is selectively exposed in response to a control signal representing image pixels at a second, finer resolution, the control signal being generated by comparing the second set of digital data with half-tone information wherein said second set of digital data is at least partly interpolated from the said first set of data, wherein a pixel value (PV) is interpolated from the pixel values $P_1-P_4$ of the neighboring pixels of said first set in accordance with the formula:

$$PV = AP_1 + BP_2 + CP_3 + DP_4$$

where A—D are weighting coefficients defining a cubic interpolation algorithm.

8. A method according to claim 1, wherein said record medium is exposed to a radiation beam modulated in response to said control signal.

9. Apparatus for generating a half-tone reproduction of an image represented by a first set of digital data defining the colour content of abutting pixels of the image at a first resolution, the apparatus comprising recording means; a record medium support wherein said recording means and the support are relatively moveable such that an image can be recorded on a record medium mounted on said support in a series of abutting scan lines; and a control signal generator for generating a control signal representing image pixels at a second, finer resolution, which is fed to the recording means such that the record medium on said support is selectively exposed at said second, finer resolution, the control signal generator being adapted to generate said control signal by comparing said second set of digital data with half-tone information, wherein the control signal generator at least partly interpolates said second set of digital data from said first set of digital data.

10. Apparatus for generating a half-tone reproduction of an image represented by a first set of digital data defining the colour content of abutting pixels of the image at a first resolution, the apparatus comprising recording means; a record medium support wherein said recording means and the support are relatively moveable such that an image can be recorded on record medium mounted on said support in a series of abutting scan lines; and a control signal generator for generating a control signal representing image pixels at a second, finer resolution, which is fed to the recording means such that a record medium on said support is selectively exposed at said second, finer resolution, the control signal generator being adapted to generate said control by comparing said second set of digital data with half-tone information, wherein the control signal generator at least partly interpolates said second set of digital data from said first set of digital data, wherein said second set of digital data is obtained from said first set by interpolating a third set of digital data defining image pixels at a third resolution finer than said first resolution but no finer than the second resolution, and thereafter replicating said third set of image data to obtain said second set.

* * * * *